United States Patent Office 2,980,597

Patented Apr. 18, 1961

2,980,597

SURFACE TREATMENT OF LEAD ALLOYED SEMI-CONDUCTOR ELEMENTS

Marceline Mazond and Georges Youssov, Paris, France, assignors to Compagnie Generale de Telegraphie Sans Fil, a corporation of France No Drawing. Filed Jan. 30, 1958, Ser. No. 712,062

Claims priority, application France Feb. 12, 1957

4 Claims. (Cl. 204—141)

The present invention relates to the manufacture of semi-conductor elements, and more particularly to a method of cleaning lead-alloyed junctions.

It is known to form such junctions by placing a small sphere or dot of an alloy of lead and one or several impurities, capable of inducing N- or P-type conductivity in the resulting semi-conductor, on a germanium wafer having a predetermined type of conductivity, and by heating the assembly to cause the impurity to fuse into germanium and penetrate up to a certain depth into the wafer, with lead serving as a vehicle. Thus, an arsenic or antimony dot may be placed on a wafer of the P-type germanium to provide a N-P-N type transistor. After firing, it is necessary to clean the surface of the junction thus obtained in order to remove any oxides or other impurities which might interfere with the operation of the junction. In the case of lead-alloyed junctions, a suitable cleaner is hard to provide. It has been found, for instance, that etching by hydrochloric acid followed by rinsing with warm distilled water, has a detrimental effect on the surface properties of germanium.

Electrolysis by means of a bath containing a mixture of perchloric acid and acetic anhydrid enables a perfect cleaning treatment of the lead alloy to be obtained. However, it results in the formation of a powdery compound which collects on the periphery of the junction and imparts thereto undesired characteristics.

Dipping or electrolysis treatment in potassium, nitric acid or glycol borate oxidize the alloy, without cleaning the periphery of the junction.

The treatment with the so-called "CP4"-solution, which is a mixture of nitric acid, fluorhydric acid, acetic and bromine, does not yield any satisfactory results.

It is an object of the invention to provide a satisfactory method of cleaning lead-alloyed junctions.

According to the invention, this treatment essentially consists in dipping the junction into a boiling, concentrated chromic acid bath. This dipping is followed by a conventional flushing with warm distilled water, by drying, and by a subsequent conventional cleaning treatment, preferably by electrolysis in potash.

The invention will be better understood from the following non-limitative embodiment which is given solely by way of example.

An N-P junction, which has been obtained by alloying a dot of lead and arsenic alloy into an indium-doped germanium wafer, is dipped into a saturated solution of a highly concentrated chromic acid. This solution is maintained in a boiling state during approximately five minutes. The junction is then withdrawn from the solution, rinsed with warm distilled water and dried.

The alloy lead dot displays a yellow orange coloration due to the formation of lead chromate, whereas the germanium wafer is dull green. Examination under a magnifying lens, shows that this coloration results from the irisation due to the roughness of the wafer surface, without any trace of visible compound when a lens having a low magnifying power is used.

The above treatment does not affect the recombination velocity of the minority carriers, neither does it improve the reverse current-voltage characteristic of the junction. It is aimed at making the subsequent conventional treatment more effective, by covering lead with a chromate film which prevents the formation of unsoluble compounds in the course of this treatment, provided the latter is not continued any longer than necessary to eliminate this film.

This subsequent treatment preferably consists in electrolysis in potash, which dissolves the lead chromate formed in the course of the attack by the chromic acid. A blasting treatment with a "CP4" solution or electrolytic in glycol borate, or any other known cleansing treatment, may also be used.

What we claim is:

1. A surface treatment of lead-alloyed semi-conductor junctions, comprising the steps of dipping the junction into a boiling, concentrated chromic acid bath, flushing with warm distilled water, drying the cleaned junction and etching to remove the chromate film.

2. A surface treatment of lead-alloyed germanium junctions, comprising the steps of dipping the junction into a boiling, concentrated chromic acid bath, flushing with warm distilled water, drying the cleaned junction and treating the cleaned and dried junction by an electrolytic etch in potash.

3. A surface treatment of lead-alloyed germanium junctions, comprising the steps of dipping the junction into a boiling, concentrated chromic acid bath, flushing with warm distilled water, drying the cleaned junction and treating the cleaned and dried junction by an electrolytic etch in glycol borate.

4. A surface treatment of lead-alloyed germanium junctions comprising the steps of dipping the junction into a boiling, concentrated chromic acid bath, flushing with warm distilled water drying the cleaned junction and submitting the cleaned and dried junction to a jet cleaning treatment with a solution of nitric acid, fluorhydric acid, acetic and bromine.

References Cited in the file of this patent

UNITED STATES PATENTS

| | | |
|---|---|---|
| 2,171,546 | Kappes | Sept. 5, 1939 |
| 2,656,496 | Sparks | Oct. 20, 1953 |
| 2,783,197 | Herbert | Feb. 26, 1957 |
| 2,847,287 | Landgren | Aug. 12, 1958 |